United States Patent [19]
Rinklin

[11] Patent Number: 6,003,933
[45] Date of Patent: Dec. 21, 1999

[54] COVERING PART MADE OF A FLEXIBLE MATERIAL FOR AN END AREA OF A VEHICLE, PARTICULARLY A PASSENGER CAR

[75] Inventor: Gerhard Rinklin, Tiefenbronn, Germany

[73] Assignee: Dr. Ing. h.c.F. Porsche AG, Weissach, Germany

[21] Appl. No.: 08/859,702

[22] Filed: May 21, 1997

[30] Foreign Application Priority Data

May 21, 1996 [DE] Germany .......................... 196 20 404

[51] Int. Cl.$^6$ .................................................. B62D 25/16

[52] U.S. Cl. .......................... 296/198; 293/126; 293/154; 29/525.12

[58] Field of Search ..................................... 296/191, 195, 296/198; 293/126, 149, 154, 155; 29/428, 525.11, 525.12

[56] References Cited

FOREIGN PATENT DOCUMENTS

| 594 955 | 5/1994 | European Pat. Off. . |
| 24 52 337 | 5/1976 | Germany . |
| 40 34 394 | 5/1991 | Germany . |

*Primary Examiner*—Andrew C. Pike
*Attorney, Agent, or Firm*—Evenson, McKeown, Edwards & Lenahan, PLLC

[57] ABSTRACT

A covering part made of a flexible material for an end area of a vehicle, particularly a passenger car, in sections, forms the outer skin of the vehicle body and, by way of laterally exterior, longitudinally directed sections, extends to adjoining wheel housings of the vehicle body. A simple fastening, which includes few components, for the laterally exterior, longitudinally directed sections of the covering part as well as an improved mounting and a relative insensitivity to tolerances are achieved. On each longitudinal side of the vehicle adjacent to the wheel housing, a holder is provided which is made of plastic. The holder is fastened on the vehicle body side. At the same time, the holder is used for fastening the upper edge area and the lower edge area of the longitudinally directed covering parts. In addition, the holder forms a partial wheel housing shell.

21 Claims, 9 Drawing Sheets

COVERING PART MADE OF A FLEXIBLE MATERIAL FOR AN END AREA OF A VEHICLE, PARTICULARLY A PASSENGER CAR

BACKGROUND AND SUMMARY OF THE INVENTION

The invention relates to a covering part made of a flexible material for an end area of a vehicle, particularly of a passenger car. The covering part, in sections, forms the outer skin of the vehicle body and extends by way of laterally exterior, longitudinally directed sections to adjoining wheel housings of the vehicle body.

In the case of a known series-produced vehicle with a rear engine, such as Porsche 911, the rear-side bumper covering part extends by way of laterally exterior, longitudinally directed sections to the adjoining wheel housings of the vehicle body.

An upper edge area of the longitudinally directed section of the covering part is held in position by a rail on the adjoining rear side part, which is situated above it, by several fastening screws. For fixing the lower edge area, two bent tube bows made of sheet metal are provided which extend around the exhaust system and are fastened on the vehicle body above the exhaust system.

The covering part is installed from below on horizontally bent lower end areas of the tube bows and is held in position by means of fastening screws. For lining the interior side of the wheel housing, separately manufactured wheel housing shells are provided which are held in position by way of fastening elements on adjoining vehicle body parts.

For fixing the laterally exterior longitudinally directed sections of the covering part, this arrangement has the disadvantage that a large number of parts are required which cause a time-consuming and cost-intensive mounting, as well as tolerance problems.

It is an object of the invention to further develop the fastening of the laterally exterior, longitudinally directed sections of the end-side covering part such that, while the mounting is simplified, the number of parts is reduced and the tolerances are absorbed better. In addition, the expenditures for the construction and the fastening of the interior wheel housing shells are to be reduced.

According to the invention, this object, and others, are achieved by a covering part made of a flexible material for an end area of a vehicle, particularly a passenger car, which, in sections, forms the outer skin of the vehicle body and extends by way of laterally exterior, longitudinally directed sections to adjoining wheel housings of the vehicle body. On each longitudinal side of the vehicle adjacent to the wheel housing, a holder is provided which is made of plastic. The holder is fastened on the vehicle body side and is used simultaneously for fastening the upper edge area and the lower edge area of the longitudinally directed sections of the covering part. The holder also forms a partial wheel housing shell. Additional characteristics which develop the invention advantageously are described herein.

The principal advantages achieved by the present invention are that the number of parts is significantly reduced and the mounting is noticeably facilitated. This is a result of the arrangement of holders which are: (1) made of a plastic material, (2) provided on each longitudinal side of the vehicle adjacent to the wheel housing, and (3) simultaneously used for the fastening of the upper edge area and of the lower edge area of the longitudinally directed sections of the covering part. In addition, the sensitivity to tolerances is reduced. Using the holders, an upper clamped fastening and a lower screwed fastening of the longitudinally directed sections of the end-side covering part takes place. Since, in addition, the holders form partial wheel housing shells, the expenditures for the construction and fastening of the interior wheel housing shells are reduced.

The integrated partial wheel housing shell protects components disposed behind it, such as an exhaust system, an OBDII sensor with a cable connection, a ventilation housing for the interior and, in sections, the vehicle body paint coat, from thrown rocks and stones and splashing water. The integrated partial wheel housing shell additionally has a muffling effect.

In addition, the appearance in the wheel housing is significantly improved. By way of ventilation slots provided on the partial wheel housing shell, the air flowing out of the vehicle interior can escape to the outside.

The holders made of plastic, which form multifunction parts, can be manufactured in a simple and low-cost manner and can be mounted rapidly and easily on the stationary vehicle body part by way of several fastening points.

Other objects, advantages, and novel features of the present invention will become apparent from the following detailed description of the invention when considered in conjunction with the accompanying drawings.

DETAILED DESCRIPTION OF THE DRAWINGS

Figure 1:
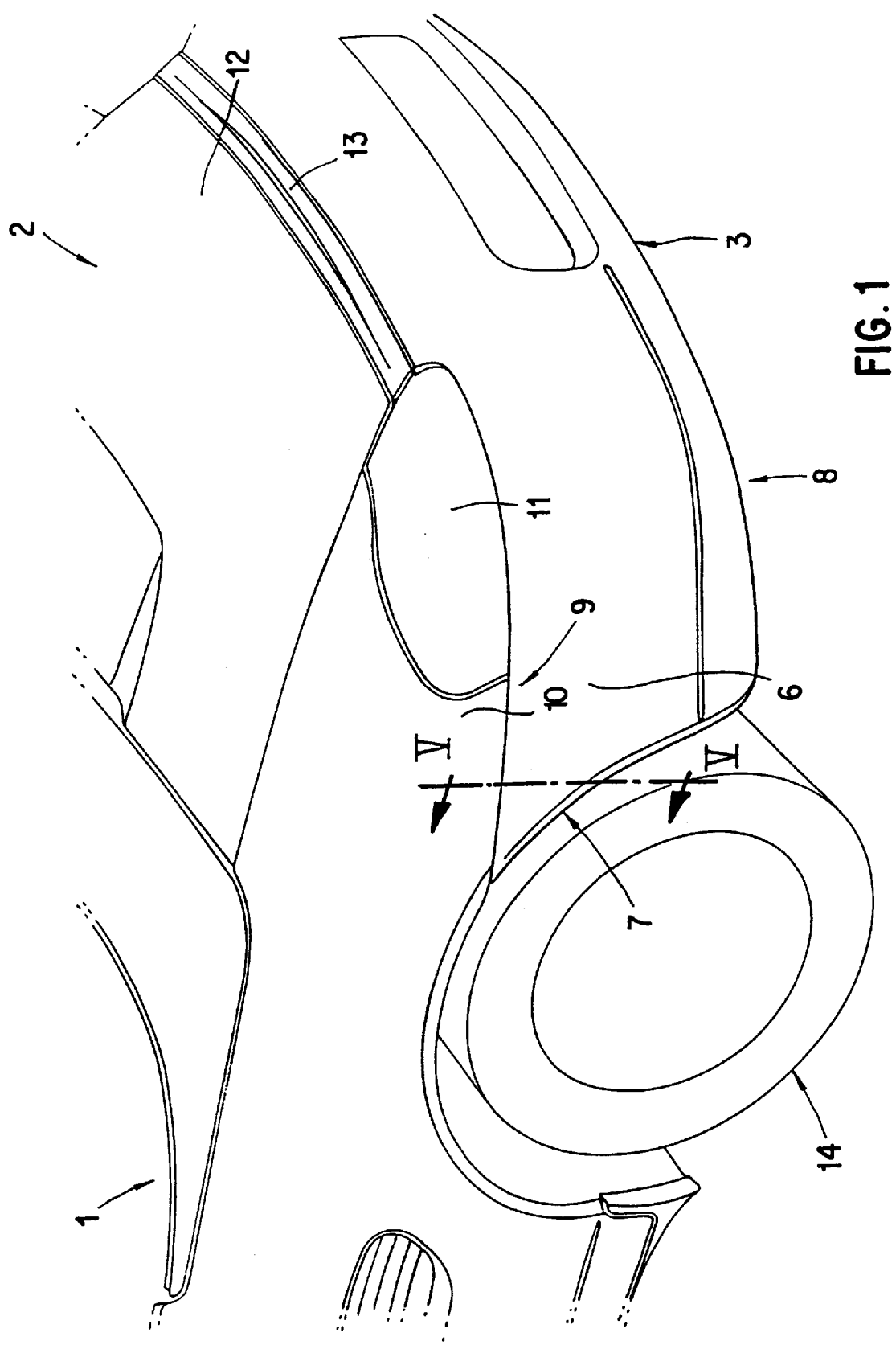
FIG. 1 is a perspective partial view of the rear area of a passenger car.

Referring to the figures, a vehicle formed by a passenger car 1 has a large-surface covering part 3 made of a flexible material in its end area 2. The covering part 3 is detachably held in position on the adjoining vehicle body 4 (see FIGS. 3 and 4). The covering part 3, which is made of a suitable plastic material, covers a transversely extending bumper support 5 which is situated inwardly and is supported on the body side, as well as the body structure of the vehicle body, assemblies, and mounting elements. In areas, the covering part 3 forms the outer skin of the vehicle body.

The covering part 3 extends along the entire width of the vehicle and extends by means of laterally exterior, longitudinally directed sections 6 to an adjoining wheel housing 7.

In the embodiment of FIG. 1, a rear area 8 of the vehicle is shown. The upper edge 9 of the covering part 3, in the area of the laterally exterior section 6, is connected to a rear side part 10 and an adjoining rear light 11.

Between the two spaced rear lights 11, the covering part 3 is connected to a rear hood 12 or a rear-side air guiding device 13. In addition, FIG. 1 shows a rear wheel 14 which extends within the wheel housing 7. However, the covering part 3 can also be assigned to a front-end area which is not shown in detail.

Figure 3:
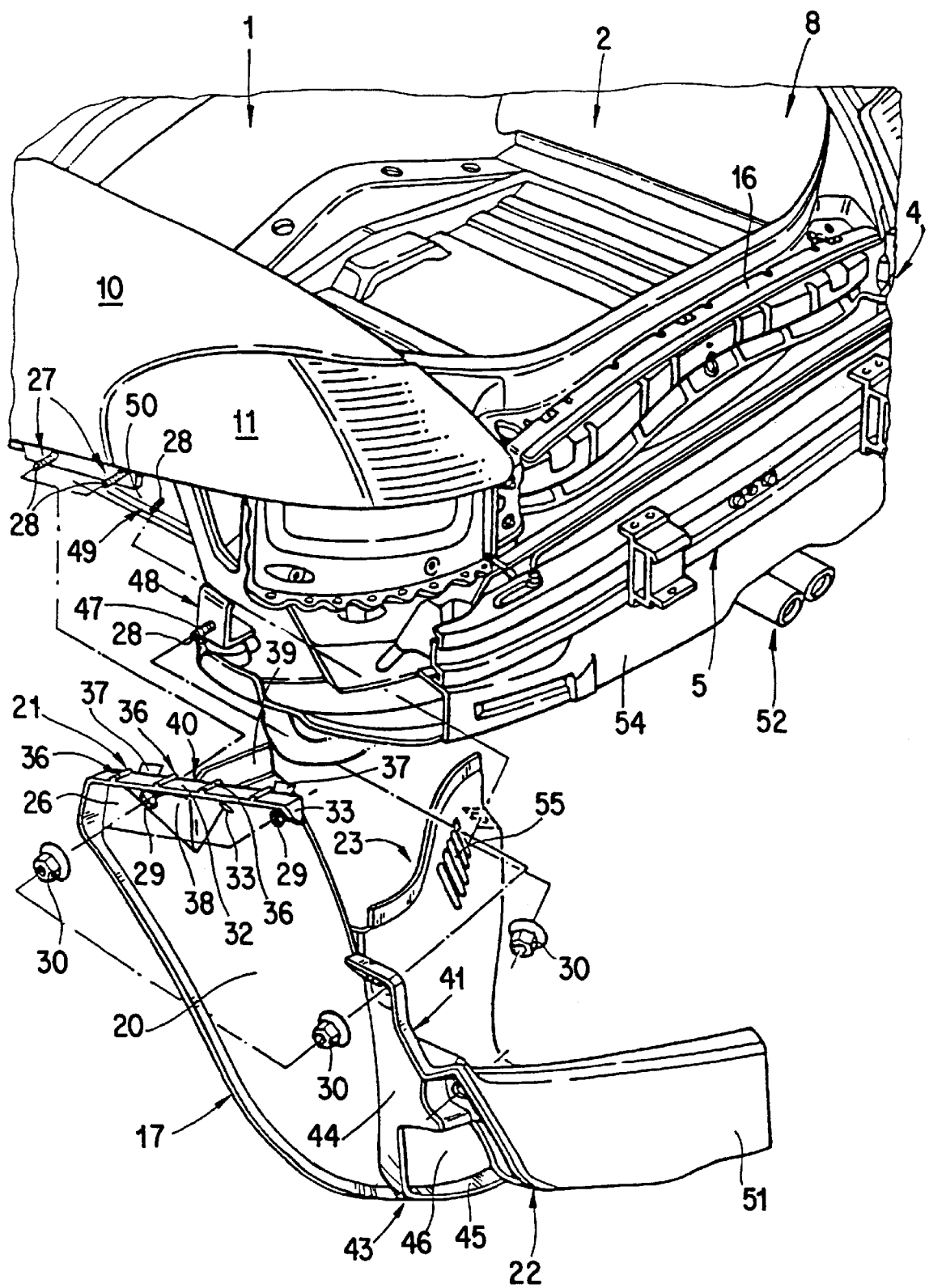
FIG. 3 is an exploded view of the rear area of the passenger car with the mounted bumper support and the not-yet-mounted lateral holder for the covering part.
Figure 4:
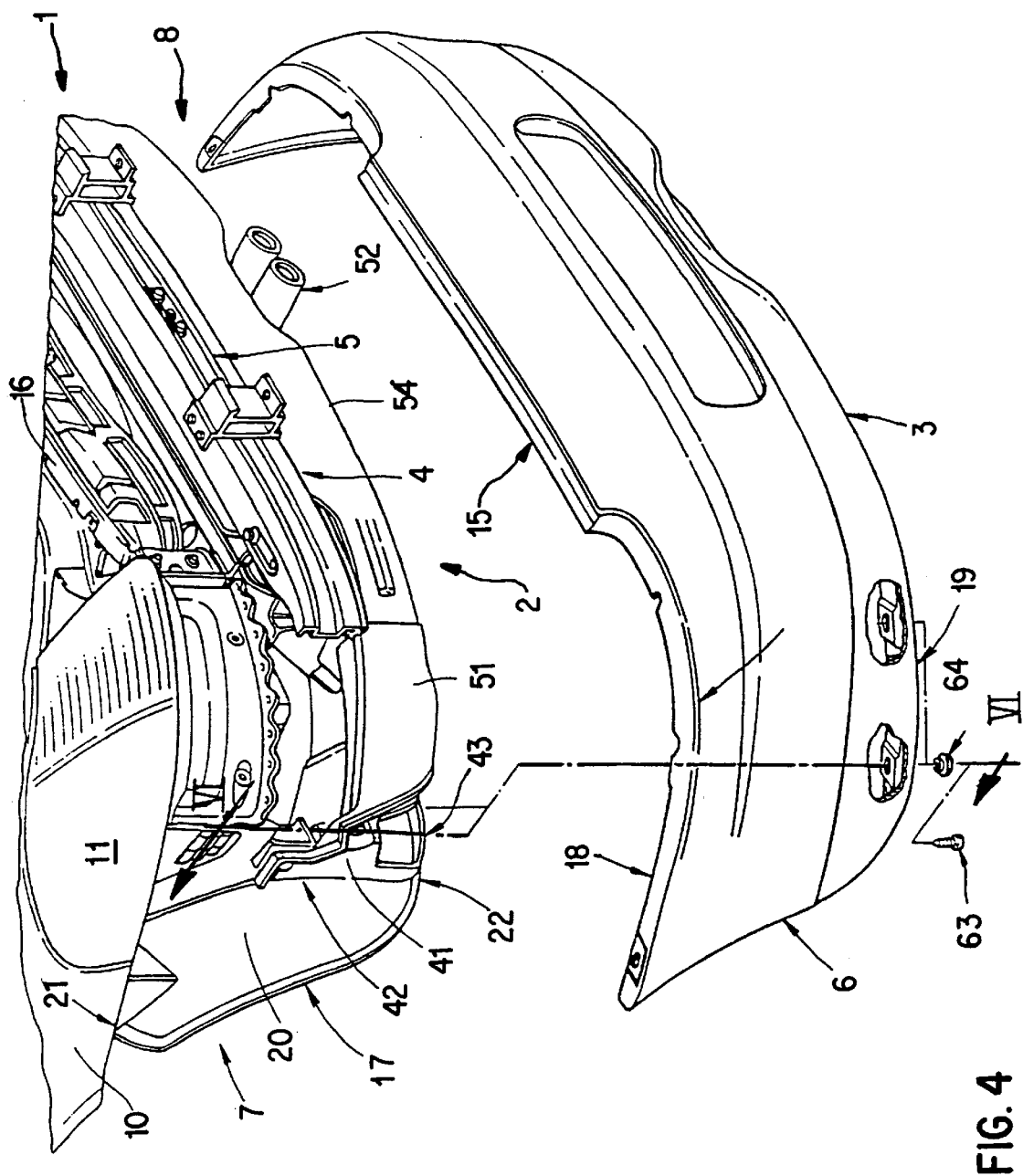
FIG. 4 is an exploded view of the rear area of the passenger car with the mounted bumper support, the mounted lateral holder, and the not-yet-mounted rear-side covering part.

Referring to FIGS. 3 and 4, in a center area 15 of the transverse course of the covering part 3, an upper, approximately horizontally bent edge of the covering part 3 is held in position on a transversely extending, vehicle-body-side holding strip 16 by means of screwable fastening elements (not shown in detail).

Below the two rear lights 11, a plug-in fastening of the upper edge of the covering part 3 on the vehicle body 4 (also not shown) takes place in sections.

Referring to FIGS. 2–9, for fixing the two laterally exterior, longitudinally directed sections 6 of the covering part 3, a holder 17, which is made of plastic, is fastened on the adjoining vehicle body 4. The holder 17 is provided on each longitudinal vehicle side adjacent to a rear edge of the wheel housing 7. This holder 17 is simultaneously used for fixing an upper edge area 18 and a lower edge area 19 of the longitudinally directed sections 6, in which case the holder 17 at the same time forms a partial wheel housing shell 20. The large-surface holder 17 is made of a thermoplastic material, for example, of a fiberglass-reinforced polypropylene and is manufactured by an injection molding process. The holder 17 and the partial wheel housing shell 20 are constructed in one piece. However, it is also possible to construct the holder 17 of a duroplastic material, such as polyurethane, by means of a foaming process.

Figure 5:
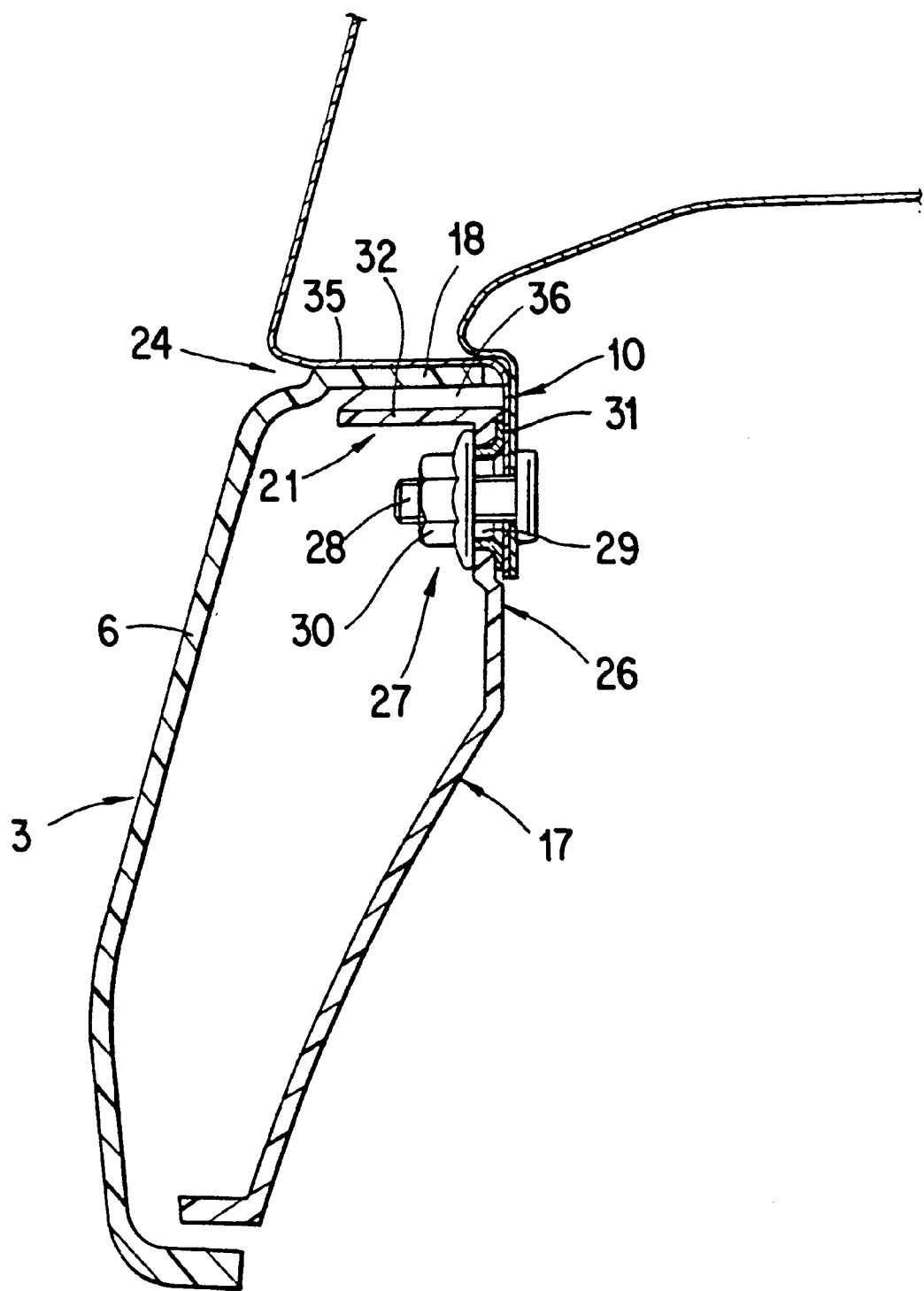
FIG. 5 is an enlarged sectional view according to Line V—V of FIG. 1.
Figure 6:
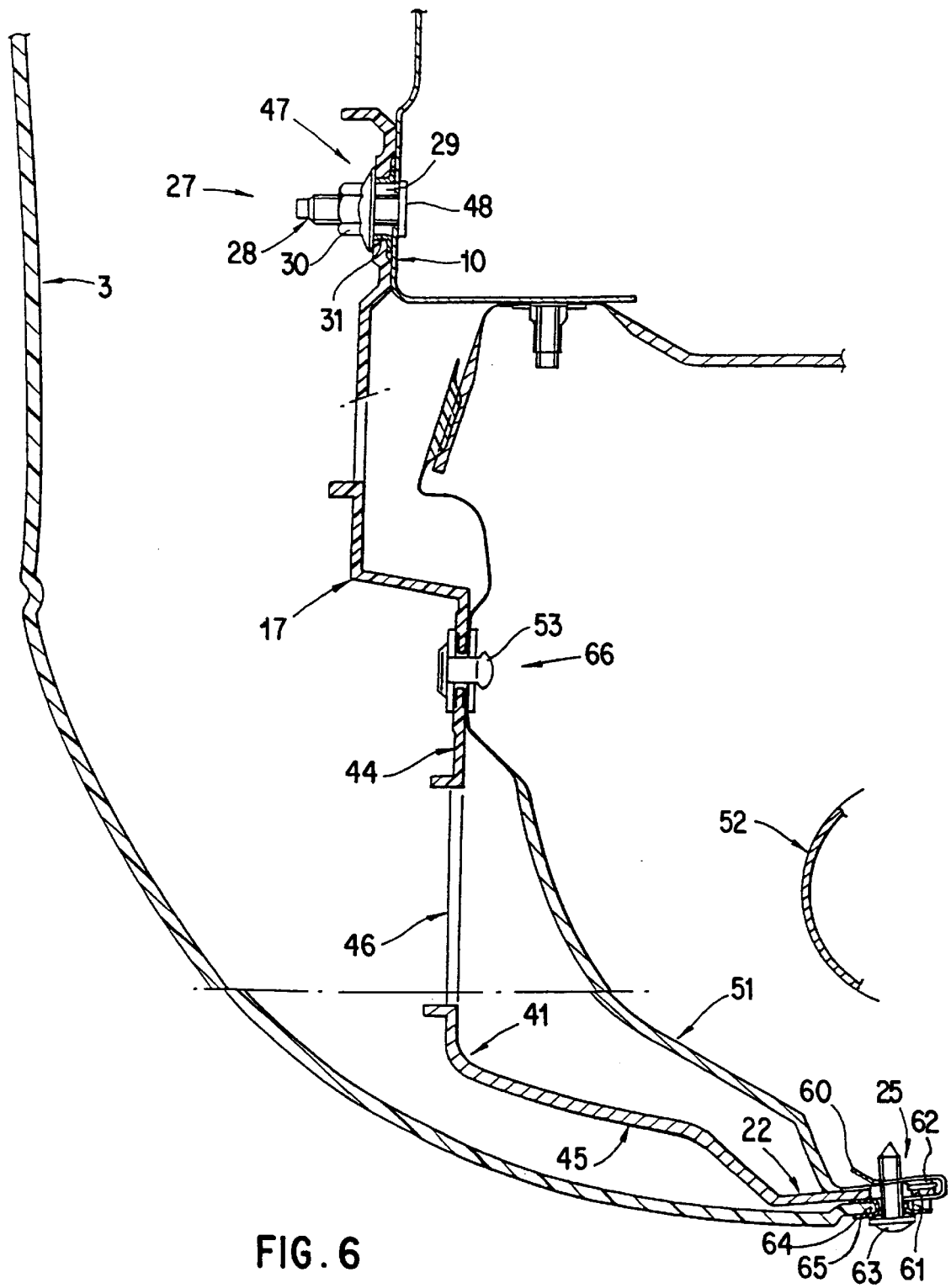
FIG. 6 is an enlarged sectional view according to Line VI—VI of FIG. 3.

In the embodiment, the holder 17 is assigned to a rear-side covering part 3 and, at the same time, forms a rearward lower partial wheel housing shell 20. The remaining wheel housing 7 can be covered by means of another interior wheel housing shell or may be exposed. The partial wheel housing shell 20 extends between an upper holding section 21 and a lower holding section 22 of the holder 17 (FIG. 3). In the area of the holding section 21, the partial shell housing shell 20 is pulled farther upwards than in an adjacent area 23. In the area of the upper holding section 21, the covering part 3 is in an operative connection with the holder 17 by way of a clamped fastening 24 (FIG. 5). In the area of the lower holding section 22, the covering part 3 is in an operative connection with the holder 17 by way of a screwed connection 25 (FIG. 6). The elongated holding section 21 of the holder 17 is aligned in the longitudinal direction of the vehicle and has an angular profile (FIG. 3) in the cross-sectional view.

In sections, a first upright leg 26 of the holding section 21 is linked to the partial wheel housing shell 20 and, when the holder 17 is mounted, rests with its interior side on the exterior side of the front-end side part 10 and is held in position there by way of screwable fastenings 27 (FIG. 5).

For this purpose, outward-projecting threaded bolts 28 are mounted on the front-end side part 10, which threaded bolts 28 project through openings 29 of the first leg 26. A collar nut 30 is screwed from the exterior side onto the free end of each threaded bolt 28.

In the area of the opening 29 of the leg 26, a distance sleeve 31 is arranged which, in the driving operation, prevents a release of the connection (plastic creep). The distance sleeve 31 is pressed into the opening 29 or is placed in the tool during the manufacturing of the holder 17 (FIG. 5). For compensating tolerances, i.e., adjustability, the openings 29 have a significantly larger diameter than the diameter of the threaded bolt 28.

The other approximately horizontally aligned leg 32 of the upper holding section 21 extends approximately at a right angle with respect to the upright leg 26. For reinforcing the holding section 21, support webs 33 extend locally between the two legs 26, 32.

The upper, approximately horizontally aligned edge area 18 of the longitudinally directed section 6 of the covering part 3 is held in position in a clamping manner between an inwardly bent flange 35 of the vehicle body 4 (front end side part 10) and the spaced leg 32 of the upper holding section 21 pointing in the same direction (FIG. 5).

The bottom side of the upper edge area 18 rests only locally on transversely extending, projecting ribs 36 of the leg 32. When the holder 17 is mounted, projecting distance elements 37 on the top side of the leg 32 provide that this holder 17 is aligned in the correct position with respect to the front-end side part 10.

For avoiding abrasions, a thin paint protection foil is provided between the exterior side of the flange 35 and the top side of the edge area 18 of section 6, which paint protection foil can selectively be mounted on one of the two parts.

By way of a longitudinally extending section 38 and a transversely extending section 39, the upper holding section 21 is connected to the partial wheel housing shell 20. A recess 40 on the top side of the transversely extending section 39 is used as a mounting aid for the holder 17.

By way of a reinforcing frame 41, the lower holding section 22 is connected to the rear side 42 and the lower edge 43 of the partial wheel housing shell 20. The reinforcing frame 41 is composed of wall sections 44, 45 which are angularly placed against one another and which, for weight reduction purposes, have a local recess 46. The wall section 44 extends in the upright direction and, in the lower area, changes in a curved manner into the other wall section 45.

Figure 8:
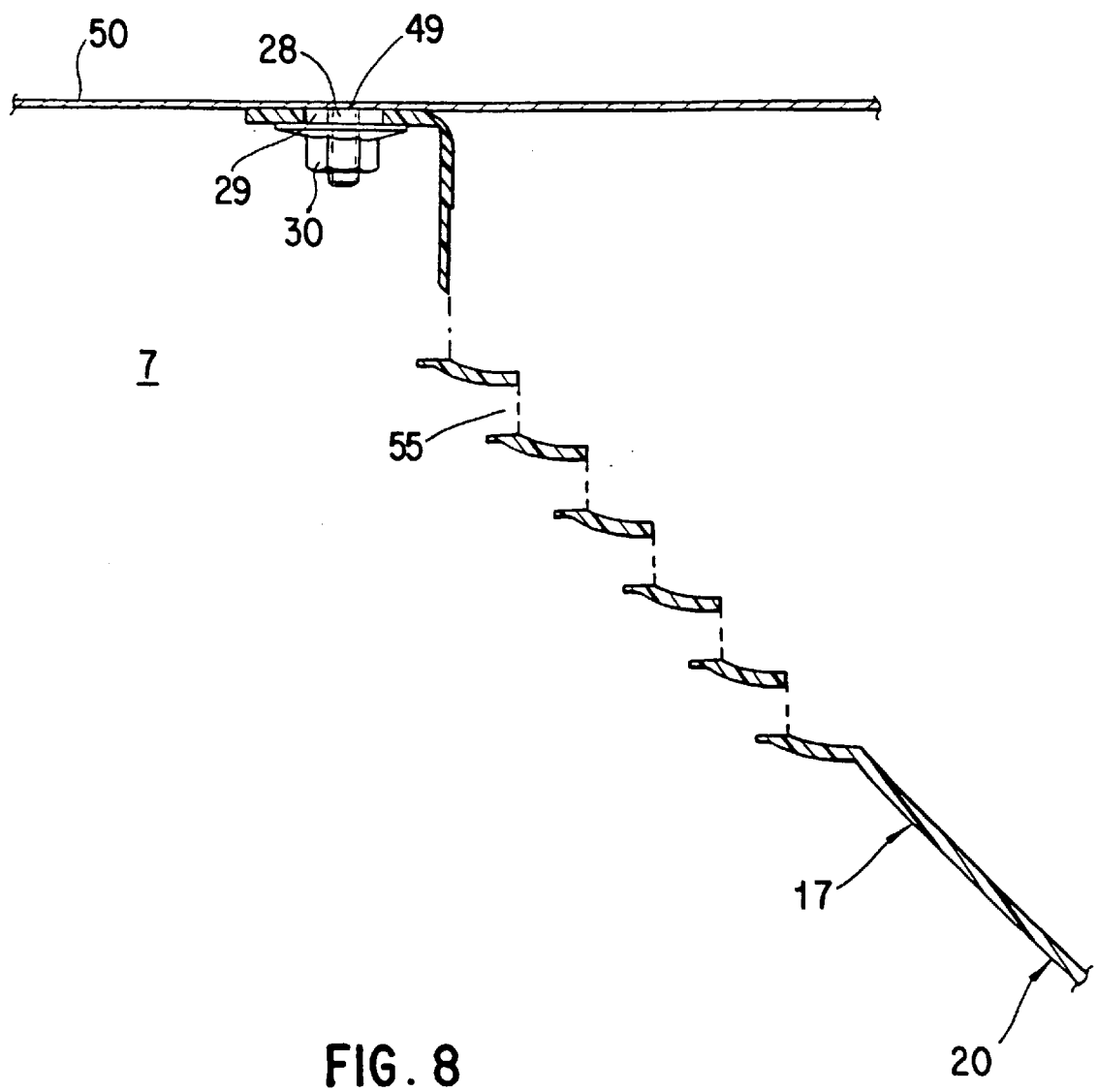
FIG. 8 is an enlarged sectional view according to Line VIII—VIII of FIG. 2.
Figure 9:
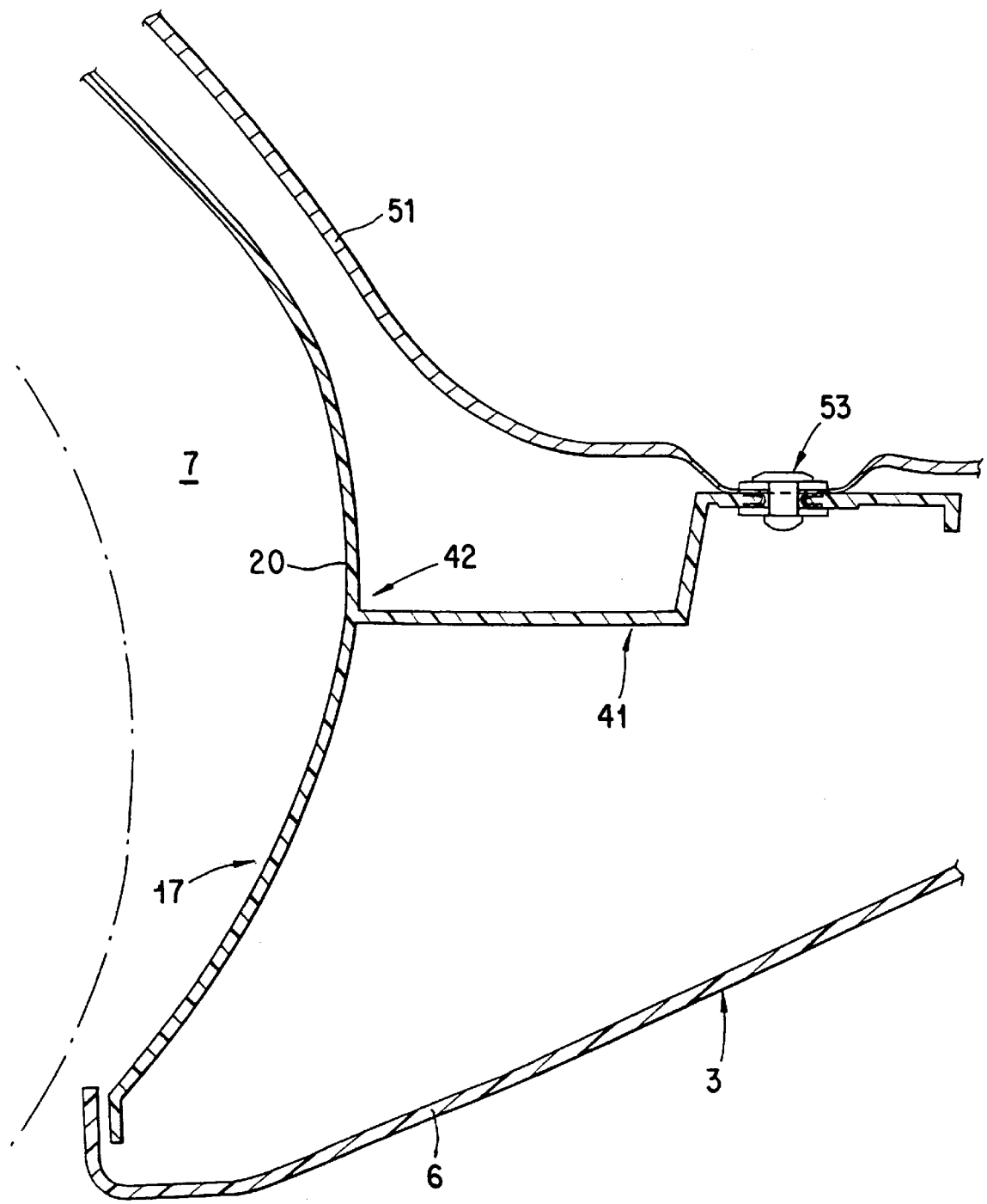
FIG. 9 is an enlarged sectional view according to Line IX—IX of FIG. 4.

In addition to being fastened at the two upper fastening points 27 on the front-end side part 10, each holder 17 is fixed by way of similarly constructed fastenings at reference number 47 on the floor 48 (FIG. 6) and, at reference number 49, at the side member in the rear 50 on the vehicle body side (FIG. 8). The holder 17 is pushed by way of openings 29 from the outside onto transversely extending threaded bolts 28. Subsequently, the collar nuts 30 are screwed on.

On the side of the holder 17 facing away from the covering part 3, a lateral heat shielding plate 51 is mounted for the adjacently arranged exhaust system 52 (FIG. 3). The heat shielding plate 51 forms a preassembled constructional unit with the holder 17.

Figure 2:
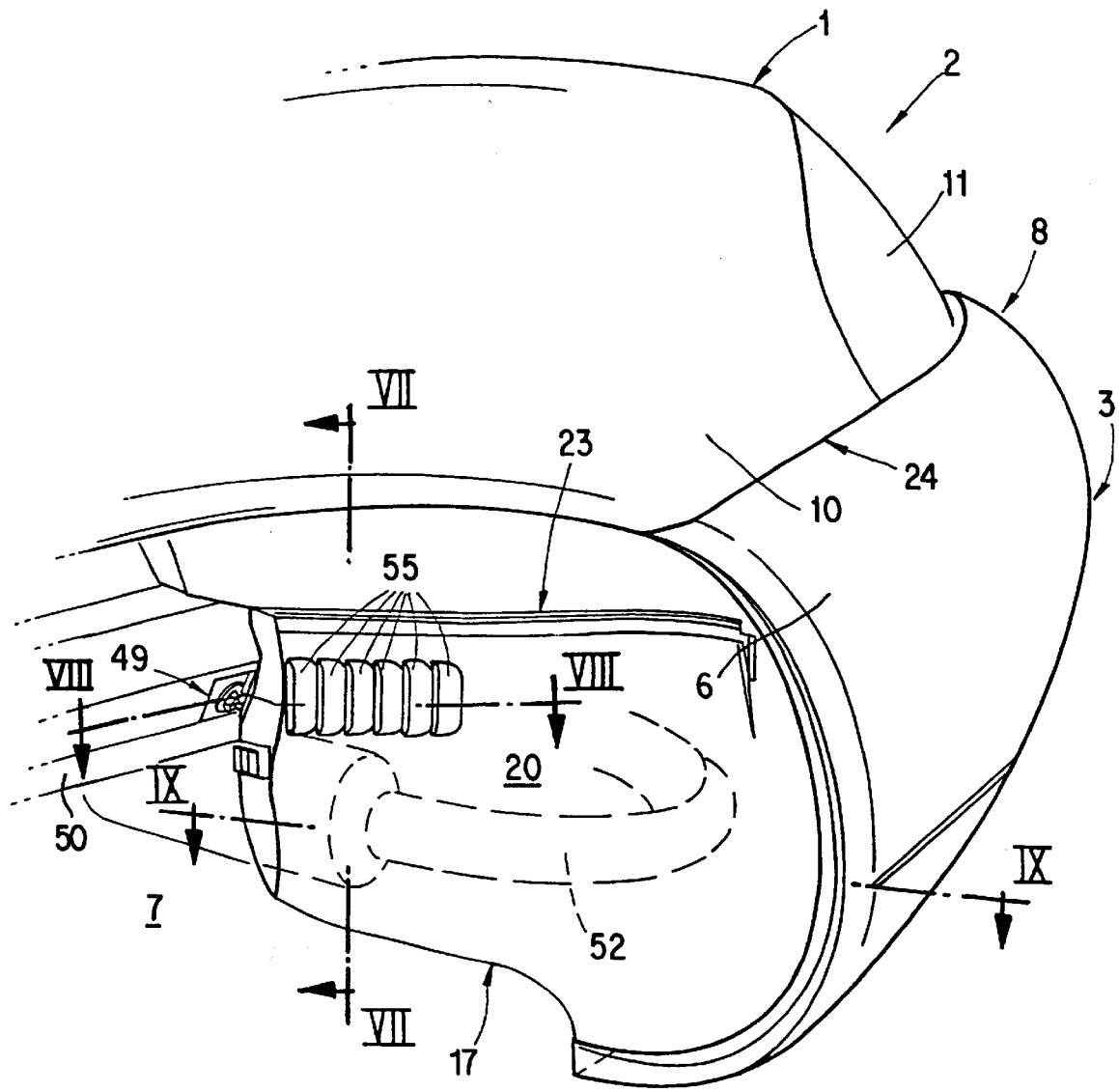
FIG. 2 is a perspective partial view from the front of a partial area of the rearward wheel housing without the wheel.

In the installed position, the lateral shielding plate 51 is connected to a transversely extending rearward shielding plate 54 which extends from the bottom side of the bumper support 5 in the downward direction and forms a prefabricated unit with it. Adjacent to the forward linking 49 of the partial wheel housing shell 20 to the vehicle body, several ventilation slots 55 are locally formed at the shell 20, through which the air coming from the vehicle interior can escape to the outside. In the longitudinal view, the ventilation slots 55 are arranged behind one another and extend approximately at the same level (FIG. 2).

Figure 7:
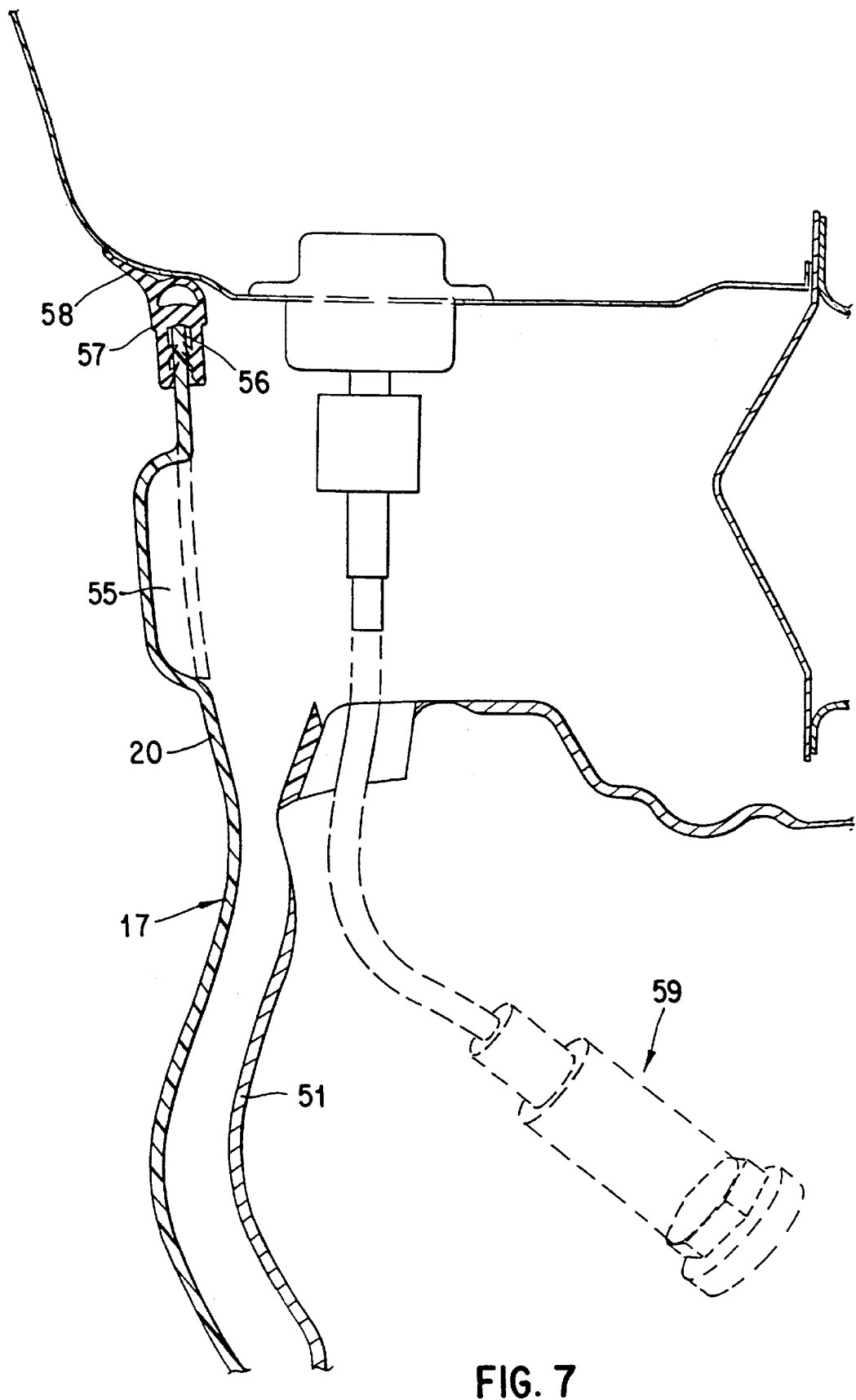
FIG. 7 is an enlarged sectional view according to Line VII—VII of FIG. 2.

According to FIG. 7, a sealing body 57 is fitted onto the upper edge 56 of the partial wheel housing shell 20. The sealing body 57 is supported by means of a sealing lip 58 on the vehicle-body-side wheel well situated above it. However, the sealing body 57 may also be injection-molded to the partial wheel housing shell 20 (one-piece construction, two-component construction).

The heat shielding plate 51 protects the exterior covering part 3 from excess heat. The partial wheel housing shell 20 protects an OBDII probe 59 disposed behind it, together with the cable and plug-type connection, from stones, rocks and splashing water. In addition, the appearance in the wheel housing area is improved and the exhaust system 52 as well as the vehicle body paint/PVC coating is protected from stones, rocks and splashing water by means of the integrated partial wheel housing shell 20.

FIG. 6 shows the fastening of the heat shielding plate 51 on the holder 17 by means of a rivet 53 arranged at reference number 66 as well as by means of two lower screwed fastenings 25.

Each screwed fastening 25 comprises a threaded nut 60 which is fitted onto a lower edge area 61 of the wall section 45 and of an edge area 62 of the heat shielding plate 51 pointing in the same direction.

A fastening screw 63 is screwed from below into the threaded nut 60 and is supported on a distance (spacer) sleeve 64 which is inserted through an opening 65 of the covering part 3. Openings for the guiding-through of the fastening screw 63 are also provided on the edge areas 61, 62.

The fitted-on threaded nuts 60 result in a preassembly of the holder 17 and the heat shielding plate 51.

After the screwing-in of the fastening screws 63, in addition, the covering part 3 is held in position on the holder 17.

Adjacent to the clamped connection 24, on the side facing the wheel housing the covering part 3 is locked by way of an additional screwed connection (not shown in detail) to the front-end side part 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A flexible material covering part for an end area of a vehicle which, in sections, forms an outer skin of a vehicle body and includes laterally exterior, longitudinally directed sections extending to adjoining wheel housings of the vehicle body, said covering part further comprising:

plastic holders, one of which is provided on each longitudinal side of the vehicle adjacent to a respective one of the wheel housings;

wherein each one of said holders is fastened on a respective side of the vehicle body and is used to fasten both an upper edge area and a lower edge area of a respective one of the longitudinally directed sections of the flexible covering part; and wherein each of said holders forms a partial wheel housing shell.

2. The covering part according to claim 1, wherein each of said holders is an injection molded holder made of a thermoplastic material.

3. The covering part according to claim 2, wherein each holder forming said partial wheel housing shell is a one-piece component.

4. The covering part according to claim 1, wherein each of said holders is comprised of a duroplastic material formed by a foaming process.

5. The covering part according to claim 4, wherein each holder forming said partial wheel housing shell is a one-piece component.

6. The covering part according to claim 1, wherein each holder forming said partial wheel housing shell is a one-piece component.

7. The covering part according to claim 1, wherein each of said holders is assigned to a rear-side portion of said covering part, and further wherein said partial wheel housing shell extends in a rearward, lower end area of the respective wheel housing.

8. The covering part according to claim 1, wherein each of said holders comprise upper holding sections and lower holding sections, an upright, transversely extending portion of said partial wheel housing shell extending between said upper and lower holding sections.

9. The covering part according to claim 1, further comprising at least one of a clamp fastener and a screw fastener operatively connecting the covering part with a respective one of said holders.

10. The covering part according to claim 1, further comprising a clamp fastener for the covering part provided in an area of an upper holding section of a respective one of said holders.

11. The covering part according to claim 1, wherein an approximately horizontally aligned upper edge area of a respective one of the longitudinally directed sections of the covering part is clamped in position between an inwardly bent flange of the vehicle body and a spaced leg of an upper holding section of one of said holders pointing in a same direction.

12. The covering part according to claim 11, wherein a bottom side of said upper edge area rests only locally on transversely extending projecting ribs of the spaced leg of the upper holding section.

13. The covering part according to claim 1, wherein an upper holding section of each of said holders has an approximately angularly profiled cross section, two legs of said angularly profiled cross section extending approximately at a right angle with respect to one another and being locally connected via transversely extending support webs.

14. The covering part according to claim 1, wherein a lower holding section of each of said holders is connected via a reinforcing frame to a rear side or a lower edge of a respective partial wheel housing shell.

15. The covering part according to claim 1, wherein on a side of each of said holders facing away from the covering part, a lateral heat shielding plate is mounted for an adjacently arranged exhaust system.

16. The covering part according to claim 15, wherein said mounted heat shielding plate forms a preassembled constructional unit with the respective holder.

17. The covering part according to claim 1, further comprising ventilation slots locally formed on said partial wheel housing shells, wherein air coming from an interior of said vehicle escapes to an exterior of said vehicle through said ventilation slots.

18. The covering part according to claim 1, further comprising a sealing body fitted onto an upper edge of a respective one of said partial wheel housing shells; and a sealing lip supporting said sealing body on a vehicle-body-side wheel well arranged above said sealing body.

19. The covering part according to claim 18, wherein said sealing body is injection molded to said respective one of said partial wheel housing shells.

20. The covering part according to claim 1, wherein said covering part is formed for a passenger car.

21. A method for assembling a flexible material covering part on an end area of a vehicle, the method comprising the steps of:

providing holders, one of said holders being provided on each longitudinal side of said vehicle adjacent to a wheel housing on each longitudinal side;

fastening said holders on a vehicle body side;

securing both an upper edge area and a lower edge area of each laterally exterior, longitudinally directed section of said flexible material covering part on a respective one of said holders; and forming partial wheel housing shells with said holders.

* * * * *